United States Patent Office 3,394,078
Patented July 23, 1968

3,394,078
PROCESS FOR REMOVING ORGANIC IODIDES FROM HYDROCARBONS
Paul V. Peurifoy and Littleton A. Woods, Houston, Tex., assignors to Shell Oil Company, New York, N.Y., a corporation of Delaware
No Drawing. Filed Jan. 20, 1966, Ser. No. 521,800
5 Claims. (Cl. 208—294)

ABSTRACT OF THE DISCLOSURE

Organic iodides formed during the iodinative dehydrogenation reaction are removed from the reaction product by subsequently contacting the product stream with dimethyl sulfoxide, as an activator, and with an alkali metal or an alloy of alkali metals. An essentially complete conversion of the iodide to alkali metal iodide takes place at ambient temperature with sufficient agitation, after which an iodide-free hydrocarbon product is recovered.

---

This invention relates to an improved process for the removal of organic iodides from the organic iodide-containing product stream obtained from an iodinative dehydrogenation reaction.

Nager, U.S. Patent 3,080,435, Mar. 5, 1963, discloses a process for dehydrogenating organic compounds involving the following steps: (1) iodinative dehydrogenation of an organic compound by reaction with elemental iodine in a molten metal iodide environment to produce a dehydrogenated compound and hydrogen iodide; (2) immediately reacting the hydrogen iodide formed in (1) with the corresponding metal oxide or hydroxide to produce the metal iodide; and (3) regenerating elemental iodine from the metal iodide by reaction with oxygen. During the entire process, the metal iodide is in a molten state. Such iodinative dehydrogenation processes produce, in addition to hydrogen iodide, small amounts of various organic iodides, particularly aromatic and vinyllic iodides, which do not react completely with the molten salt mixture. This is especially true in the iodinative dehydrogenation of lower aliphatic hydrocarbons, particularly of $C_4$ and $C_5$ hydrocarbons, such as the iodinative dehydrogenation of n-butane to butadiene of isopentane to isoprene, and of the iodinative dehydrocoupling of isobutylene to p-xylene. See also, U.S. 2,890,253, June 9, 1959, to Mullineaux et al., and U.S. 3,130,241, Apr. 21, 1964, to Baijle and Kwantes, where some organic iodides are produced.

In some cases, a separation of the unwanted organic iodides from the product can be effected by a distillation; however, in many other cases, e.g., the deiodination of divinylbenzene obtained from diethylbenzene, distillation and other procedures are ineffective, the distillation apparatus becoming plugged with polymer and/or coke.

It is, therefore, a principal object of this invention to provide an improved process for iodinative dehydrogenation whereby organic iodides formed during the iodinative dehydrogenation are more efficiently removed from unsaturated compounds.

Other objects and advantages of this invention will be apparent and better understood from the following detailed description.

In accordance with the present invention, it has been found that the by-product organic iodides formed during the iodinative dehydrogenation reaction, which contaminate the primary reaction product, can be removed by subsequent treatment of the unsaturated hydrocarbon product stream, or a portion of it, with a finely divided alkali metal, preferably Na or K, in the form of a dispersion, or an alloy of alkali metals, preferably a Na-K alloy, in the presence of a minor proportion of dimethyl sulfoxide (DMSO), to effect an essentially complete conversion of the iodide to alkali metal iodide. A total iodine content of the product of 0.1–0.3% by weight can be reduced to less than 5 parts per million by utilizing the process of this invention.

More specifically, the process can be carried out as follows: Dimethyl sulfoxide is added as an activator to the hydrocarbon to be treated in a volume ratio of about 1:100 (DMSO:hydrocarbon) or in a weight ratio of about 1:10 to 10:1 based on the iodine content. An alkali metal, preferably sodium or potassium, or an alloy of alkali metals, preferably sodium-potassium alloy, is added to the hydrocarbon-DMSO mixture. The mixture is agitated at ambient temperature (20–30° C.) for a time sufficient for the reaction to reach completion, after which the iodine-free hydrocarbon product is recovered.

Addition of sodium-potassium alloy alone gave a reduction in the total iodine content of only about 32%; "sodium shot" alone gave no reduction in iodine content. Although when sodium or potassium is used alone, very little if any reduction in iodine content is found, the addition of only a small amount of DMSO to the reaction mixture, together with a sodium or potassium dispersion or a Na-K alloy, gives essentially a 100% reduction in iodine content.

For the sake of brevity and specificity, the invention will be described with reference to the clean-up of divinylbenzene produced by the iodinative dehydrogenation of diethylbenzene. However, it is to be understood that the invention is equally applicable to the clean-up of any and all of the systems described by Nager in U.S. Patent 3,080,435.

Care must be taken in the iodinative dehydrogenation of diethylbenzene to avoid polymerization of the divinylbenzene product and the vinyllic iodides formed as by-products. Due to the strong reactivity of the vinyl group, it would be expected that free radical initiated polymerization would occur very rapidly, in the presence of alkali metals or alkali metal alloys as free radical initiators. It has been found, however, that such polymerization does not occur in the presence of a small amount of DMSO, even with the alkali metal or alkali metal alloy present. An essentially iodine-free product can be recovered, without the occurrence of undesirable side reactions.

In a preferred embodiment of the invention, a sodium-potassium alloy is used with a small amount of DMSO, since the preferred alloys are liquids at ambient temperatures and react differently from the alkali metals alone, the alloys leading to faster reactions at lower temperatures.

The sodium-potassium alloys of this invention contain from 4 to 60% Na and from 96 to 40% K. A preferred range is 22 to 44% Na and 78 to 56% K.

The following examples are given for illustrative purposes only, and are not to be considered as limitations on the invention. All percentages are expressed in percent by weight unless otherwise noted.

Example 1

To 65 ml. of divinylbenzene (obtained by iodinative dehydrogenation of diethylbenzene and containing 0.17% iodine impurities, substantially as aromatic iodides) and 0.65 ml. DMSO was added 4.4 grams of NaK alloy (23% Na–77% K). The mixture was allowed to react for one-half hour at 25° C., with agitation, and was filtered through an alumina bed, washed with water, and dried. Analysis of the product showed a reduction in iodine content with less than 0.01% of the iodine remaining in the product.

Example 2

To 900 ml. of divinylbenzene (containing 0.13% iodine), and 9 ml. DMSO was added 13 grams of NaK alloy (23% Na–77% K). The mixture was agitated for one-half hour at 25° C., after which the product was filtered, washed with water, and dried. Product analysis showed less than 0.0005% total iodine remaining. GLC analysis showed that no undesirable side reactions had occurred.

Example 3

50 ml. of divinylbenzene (containing 0.17% organic iodides) was treated with 4.1669 grams of NaK alloy (42.48% Na–57.52% K). No DMSO was added. The mixture was agitated for 1½ hours at 25° C. At the end of the reaction period, product analysis showed a reduction in the total iodine content from 0.17% to 0.12%.

Example 4

The procedure of Example 1 is repeated, with the exception that an equivalent amount of a sodium dispersion is used in place of the sodium-potassium alloy. Similar results are obtained.

The present invention has several advantages, among these being that the reaction can be carried out at ambient or low temperatures; there is an essentially complete reaction of the organic iodides; only a small amount of the activator, DMSO, is necessary; and the separation of the metal iodide from the hydrocarbon is achieved by filtration.

Still other changes such as will be apparent to those skilled in the art may be made without departing from the spirit of this invention, which is to be regarded as limited only by the terms of the appended claims.

We claim as our invention:

1. A process for removing organic iodides from an organic iodide-containing hydrocarbon product stream obtained from an iodinative dehydrogenation reaction comprising intimately contacting the organic iodide-containing hydrocarbon stream with dimethyl sulfoxide and with at least a stoichiometric amount of a metal based on the iodine present in said product, said metal being selected from the group consisting of the alkali metals and alloys of alkali metals, at ambient temperature and with agitation, and recovering a substantially iodide-free hydrocarbon product.

2. A process in accordance with claim 1 wherein the volume ratio of dimethyl sulfoxide to the organic iodide-containing hydrocarbon stream is about 1:100.

3. A process in accordance with claim 1 wherein the alloy consists essentially of about 4 to 60% sodium and about 96 to 40% potassium.

4. A process in accordance with claim 1 wherein the alkali metal is a dispersion of sodium or potassium.

5. A process as claimed in claim 1 which includes the steps of filtering, washing with water and drying to recover the organic iodide-free hydrocarbon product.

References Cited

UNITED STATES PATENTS

| | | | |
|---|---|---|---|
| 3,097,157 | 7/1963 | Accountius | 208—294 |
| 3,275,704 | 9/1966 | Mill | 260—683.3 |
| 3,331,883 | 7/1967 | Bittner | 260—683.3 |

DELBERT E. GANTZ, *Primary Examiner.*

G. J. CRASANAKIS, *Assistant Examiner.*